UNITED STATES PATENT OFFICE.

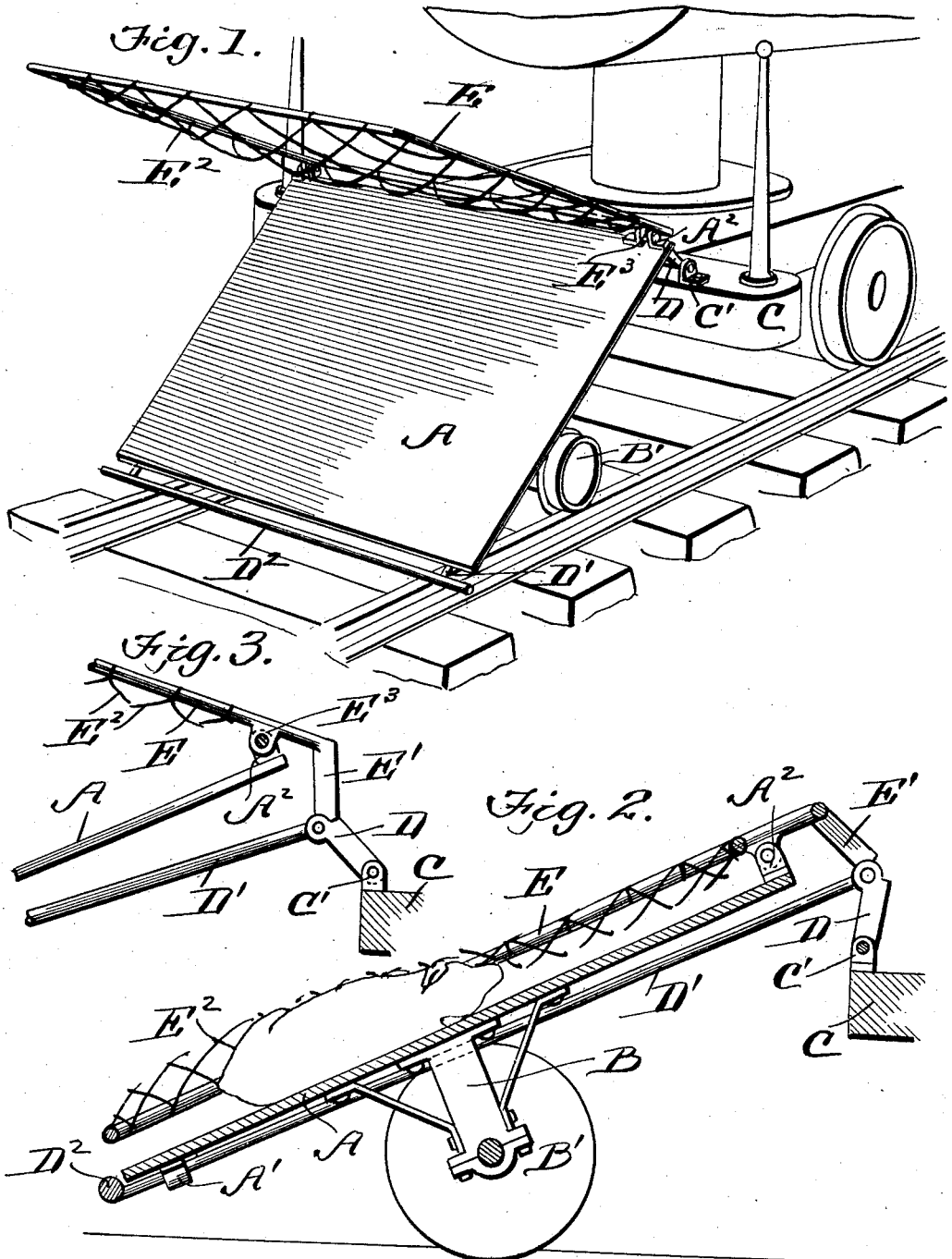

JOHN WESLEY PRITCHETT, OF HOLLY SPRINGS, MISSISSIPPI.

CAR-FENDER.

No. 833,337.  Specification of Letters Patent.  Patented Oct. 16, 1906.

Application filed April 14, 1905. Serial No. 255,555.

*To all whom it may concern:*

Be it known that I, JOHN WESLEY PRITCHETT, a citizen of the United States, residing at Holly Springs, in the county of Marshall and State of Mississippi, have invented a new and useful Improvement in Car-Fenders, of which the following is a specification.

This invention relates to a fender designed more especially for locomotives, and has for its object the retaining upon the lower portion of the fender any object which may be struck by the engine, thereby preventing the said object from being killed by being thrown against some object, such as a telegraph-pole, tree, or other obstacle.

The invention consists of a solid fender carried by the pilot of the engine and always resting in a downwardly-inclined position and an upper fender formed of network adapted to be dropped over the lower fender when tripped, the two fenders comprising jaws the upper one of which is movable and adapted to hold upon the lower fender any object that may be struck by the said lower fender.

In the accompanying drawings, Figure 1 is a perspective view of my device in its normal position. Fig. 2 is a longitudinal sectional view showing the device with the upper fender in a tripped position. Fig. 3 is a detail sectional view showing the manner of hinging the rear portions of the upper and lower fenders.

In the drawings, A represents what may be termed as the "lower" jaw of the device and which consists of a solid downwardly-inclined fender mounted upon a suitable truck B, which is provided with wheels B', adapted to travel upon the truck in advance of the pilot-truck of the engine. Upon the pilot-beam C of the engine I place angled brackets C', to which are pivotally connected links D, and to these links are pivotally connected the rear free ends of the U-shaped frame D', the said frame having a straight yoke member $D^2$, which extends parallel to the lower edge of the jaw A, and the side members of the frame D' are adapted to work through eyes A', carried by the jaw or fender A. The upper jaw consists of the rectangular frame E, which is provided with angled arms E' at its rear end, and the said arms are hinged to the links D. A suitable network $E^2$ is arranged loosely on the frame E and forms a net adapted to inclose any object which may be resting upon the fender A. The fender A is provided with ears $A^2$ at its rear end, which are pivoted to suitable ears $E^3$, carried by the frame E, adjacent but in advance of the arms E'.

In operation the parts are so balanced that the frame E, which with its network forms the upper or movable jaw, would be upwardly and forwardly inclined, as shown in Fig. 1. Any object upon the track when struck by the fender A would also come into contact with the yoke member $D^2$ of the frame D', and the said frame would be forced rearwardly, its side members sliding in the eyes A', and this sliding movement would first throw the links D and the arms E' into alinement and then into a position at an angle to each other opposite to that occupied in their normal position, thereby dropping the movable jaw, consisting of the frame E and net $E^2$, downward and into a position parallel to the fender or lower jaw A, and the network $E^2$ would inclose the object caught by the fender A and prevent its being thrown therefrom.

Having thus fully described my invention, what I claim as new, and desire to secure by Letters Patent, is—

1. A device of the kind described comprising a stationary fender, a fender pivotally mounted upon the stationary fender and adapted to normally rest in a position at an angle to the stationary fender, and a slidable frame carried by the stationary fender and normally projecting in advance of the same, and means for connecting the rear portion of said slidable frame to the pivoted fender, the said pivoted fender falling upon the stationary fender upon rearward movement of the slidable frame.

2. A device of the kind described comprising a downwardly-inclined fender, a truck supporting the same, a slidable U-shaped frame, eyes on the fender engaging side members of the U-shaped frame, links pivotally connecting the said U-shaped frame to the object carrying the fender, a rectangular frame having angled arms hinged to the links, the said frame being pivotally connected to the rear end portion of the fender and a network carried by the said frame.

JOHN WESLEY PRITCHETT.

Witnesses:
E. M. HALL,
G. P. HARRISON, Jr.